(12) United States Patent
Kim et al.

(10) Patent No.: US 8,520,378 B2
(45) Date of Patent: Aug. 27, 2013

(54) SWING-TYPE PORTABLE COMMUNICATION APPARATUS AND HINGE MECHANISM THEREOF

(75) Inventors: Won-Tae Kim, Gyeonggi-do (KR); Sung-Ho Ahn, Seoul (KR); Pil-Je Cho, Gyeonggi-do (KR)

(73) Assignees: Samsung Electronics Co., Ltd., Yeongtong-gu, Suwon-si, Gyeonggi-do (KR); Seneka Co., Ltd., Yeongtong-dong, Yeongtong-gu, Suwon-si, Gyeonggi-do (KR)

( * ) Notice: Subject to any disclaimer, the term of this patent is extended or adjusted under 35 U.S.C. 154(b) by 290 days.

(21) Appl. No.: 13/014,016

(22) Filed: Jan. 26, 2011

(65) Prior Publication Data
US 2011/0194268 A1 Aug. 11, 2011

(30) Foreign Application Priority Data
Feb. 8, 2010 (KR) ........................ 10-2010-0011681

(51) Int. Cl.
| G06F 1/16 | (2006.01) |
| H05K 5/00 | (2006.01) |
| H05K 7/00 | (2006.01) |
| H05K 7/02 | (2006.01) |
| H05K 7/04 | (2006.01) |
| E05D 15/00 | (2006.01) |

(52) U.S. Cl.
USPC ................. 361/679.27; 361/807; 361/679.3; 16/362

(58) Field of Classification Search
USPC .................... 361/807, 679.27, 679.3; 16/362
See application file for complete search history.

(56) References Cited

U.S. PATENT DOCUMENTS

| 7,187,364 | B2 * | 3/2007 | Duarte et al. | 345/168 |
| 7,376,450 | B2 * | 5/2008 | Chen | 455/575.4 |
| 7,496,194 | B2 * | 2/2009 | Jeun | 379/433.11 |
| 7,865,151 | B2 * | 1/2011 | Cho | 455/90.3 |
| 7,916,473 | B2 * | 3/2011 | Jang | 361/679.55 |
| 7,953,463 | B2 * | 5/2011 | Misawa | 455/575.1 |
| 7,986,983 | B2 * | 7/2011 | Harmon et al. | 455/575.4 |
| 8,046,033 | B2 * | 10/2011 | Park et al. | 455/575.1 |
| 8,072,427 | B2 * | 12/2011 | Pletikosa et al. | 345/169 |
| 8,122,568 | B2 * | 2/2012 | Jin et al. | 16/357 |
| 8,180,417 | B2 * | 5/2012 | Kim et al. | 455/575.4 |
| 2003/0064758 | A1 * | 4/2003 | Mizuta et al. | 455/566 |
| 2003/0125081 | A1 * | 7/2003 | Boesen | 455/556 |
| 2003/0197628 | A1 * | 10/2003 | Hsu | 341/22 |
| 2005/0107137 | A1 * | 5/2005 | Byun et al. | 455/575.1 |
| 2006/0046797 | A1 * | 3/2006 | Chen | 455/575.4 |
| 2007/0197270 | A1 * | 8/2007 | Kim | 455/575.4 |
| 2008/0132303 | A1 * | 6/2008 | Naukkarinen et al. | 455/575.4 |
| 2008/0307607 | A1 * | 12/2008 | Kim et al. | 16/330 |

* cited by examiner

*Primary Examiner* — Bradley Thomas
*Assistant Examiner* — Theron Milliser
(74) *Attorney, Agent, or Firm* — Cha & Reiter, LLC

(57) ABSTRACT

A swing-type portable communication apparatus includes a body housing having a first display part, a swing housing having a second display part and capable of being obliquely slid and juxtaposed with the body housing at the same angle without a height difference after being swung from the body housing. A hinge mechanism is provided at one end of the body housing for obliquely sliding the swing housing after the swing housing is swung from the body housing.

15 Claims, 12 Drawing Sheets

SWING-TYPE PORTABLE COMMUNICATION APPARATUS AND HINGE MECHANISM THEREOF

CLAIM OF PRIORITY

This application claims priority under 35 U.S.C. §119(a) from a Korean Patent Application entitled "Swing-Type Portable Communication Apparatus And Hinge Mechanism Thereof" filed in the Korean Intellectual Property Office on Feb. 8, 2010 and assigned Serial No. 10-2010-0011681, the contents of which are incorporated herein by reference in its entirety.

BACKGROUND OF THE INVENTION

1. Field of the Invention

The present invention relates to a swing-type portable communication apparatus and a hinge mechanism thereof. More particularly, the present invention relates to a swing-type portable communication apparatus having a display part without a height difference after the display part is swung open.

2. Description of the Related Art

In general, a portable communication apparatus generally refers to a device that provides a user with the ability to have a wireless communication with another party, while carrying it. Such a portable communication apparatus includes, for example, a hand held product (HHP), a CT-2, a cellular phone, a digital phone, a personal communications service (PCS) phone, a personal digital assistant (PDA) or the like, which may be classified into various types depending on appearances thereof.

For example, the portable communication apparatuses can be divided into a number of classifications including a bar-type, a flip-type, a folder-type, a swing-type or a slide-type, all of which are classified according to their respective appearance. The conventional portable communication apparatuses as listed above are essentially provided with an antenna device (which is recent years has been internally arranged), a data input/output device, and a data transmitting/receiving device. As a data input/output device, a keypad which is able to input data by typically pushing operations with the user's fingers (touch) has come into widespread use.

As an example of the portable communication apparatus, a swing-type portable communication apparatus will be described hereinbelow.

As shown in FIGS. 1 and 2, the conventional swing-type portable communication apparatus includes a body housing 10 with a detachable battery pack (not shown), a swing housing 20 rotatable (e.g. pivots) about a hinge axis A1 which is extended in a perpendicular direction in the front surface of the body housing 10, while facing the body housing 10, and a hinge module (not shown) for rotatably securing the swing housing 20 to the body housing 10 in a state of facing the latter.

The conventional swing-type portable communication apparatus as described above is configured to rotate the swing housing in a state in which the swing housing is facing the body housing, so as to create a height difference therebetween due to the thickness of the respective housings, thereby deteriorating the design of a product. Further, when the swing housing is provided with a display part and the body housing has a keypad and another display part, there is inconvenience should one desire simultaneously to use the keypad and each display part because of the height difference of the respective housings.

Hence, there has been a long-felt need in the art to develop a mechanism which can juxtapose the keypad and the display parts provided at the respective housings at the same angle without a height difference.

SUMMARY OF THE INVENTION

Accordingly, the present invention provides a swing-type portable communication apparatus and a hinge mechanism thereof having another display part which is juxtaposed, i.e., arranged in parallel with a display part at the same angle without a height difference after the display part is swung. In the present invention, each display part is arranged at the same angle without a substantial height difference to be used as one wide display part which can be maximized, wherein the maximized display part can be utilized as a touch screen and a keypad to improve usage of the device, and wherein the aesthetic appearance of a product design can be improved and the product can be much thinner.

In accordance with the present invention, there is provided a hinge mechanism of a swing-type portable communication apparatus, which includes a body housing having a first display part, a swing housing having a second display part and being obliquely slidable from a first position over the body housing for being juxtaposed at a second position at an equal angle without a height difference with the body housing after being swung from the body housing, and a hinge mechanism provided at one end of the body housing for obliquely sliding the swing housing after the swing housing is swung from the first position to the second position, the hinge mechanism including: a hinge housing provided at one end of the body housing; a swing hinge part provided at the hinge housing and coupled with the swing housing for enabling the swing housing to be rotated; and a slide hinge part coupled with the swing hinge part for enabling the swing housing and the swing hinge part to be obliquely slid.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Figure 1:
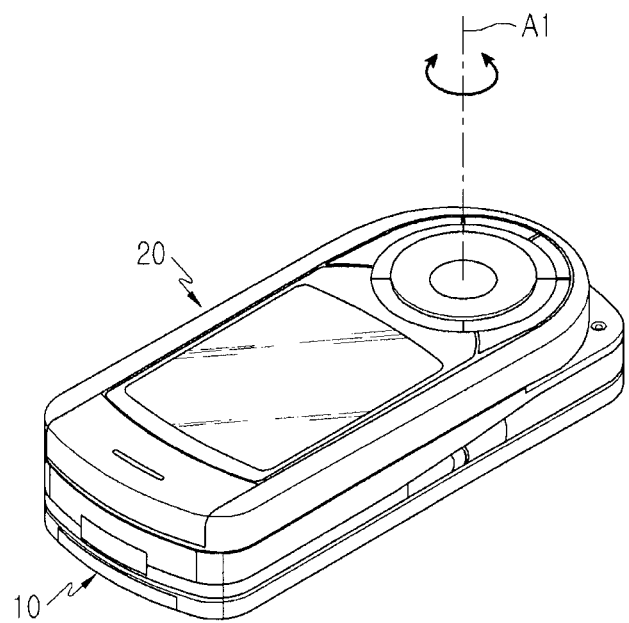
FIG. 1 is a perspective view illustrating a swing-type portable communication apparatus in the prior art, showing a state before a swing housing is swung.
Figure 2:
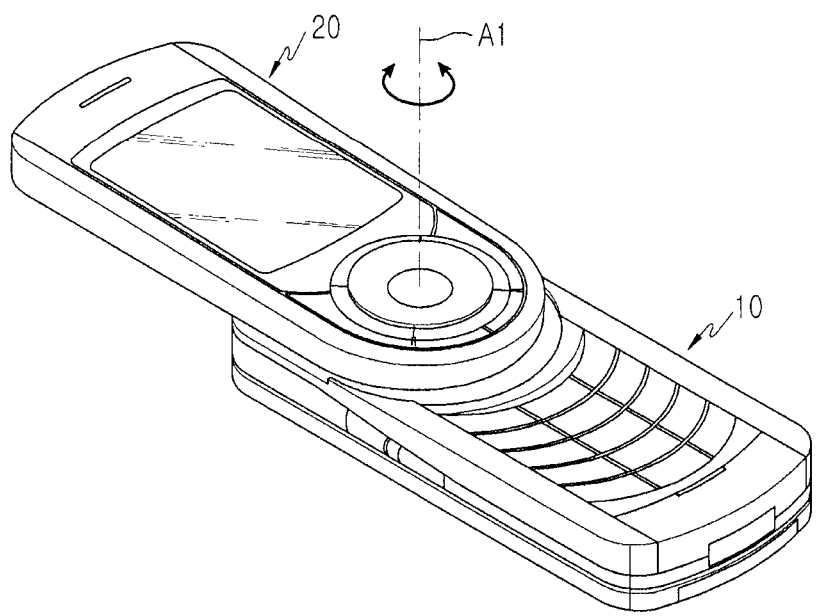
FIG. 2 is a perspective view illustrating the swing-type portable communication apparatus in the prior art, showing a state after the swing housing is swung.

Hereinafter, exemplary embodiments of the present invention will be described with reference to the accompanying drawings. In the following description, various specific definitions are provided to assist a person of ordinary skill in the art to understand of the present invention and not for limitation of the scope of the appended claims, and it is apparent to those of ordinary skill in the art that the present invention can be implemented without such definitions.

Referring now to FIGS. 3 to 19, a swing-type portable communication apparatus 100 according to the present invention includes a body housing 200 having a first display part 201, a swing housing 300 having a second display part 301, and a hinge mechanism 400. The body housing 200 is designed to support the swing housing 300 to be obliquely slidable after the swing housing 300 is swung/pivoted to an opened position. The swing housing 300 is positioned preferably over the upper surface of the body housing 200, wherein the swing housing 300 is obliquely slid and juxtaposed with the body housing 200 at the same angle without a height difference after being swung from the body housing. The hinge mechanism 400 is provided at one end of the body housing 200 for obliquely sliding the swing housing 300 after the swing housing is swung.

Figure 3:
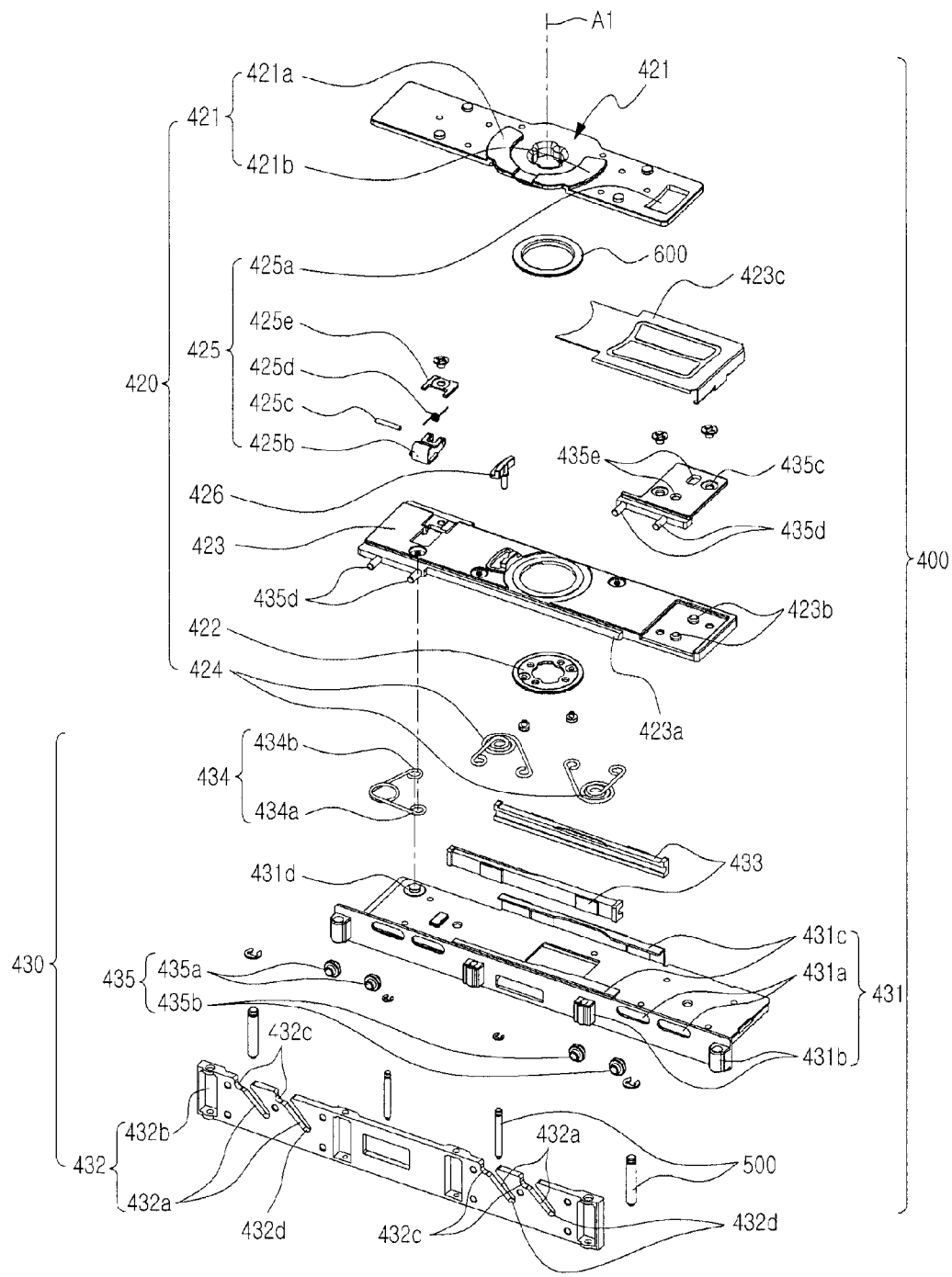
FIG. 3 is an exploded perspective view illustrating a configuration of a hinge mechanism of a swing-type portable communication apparatus in accordance with a preferred exemplary embodiment of the present invention.
Figure 4:
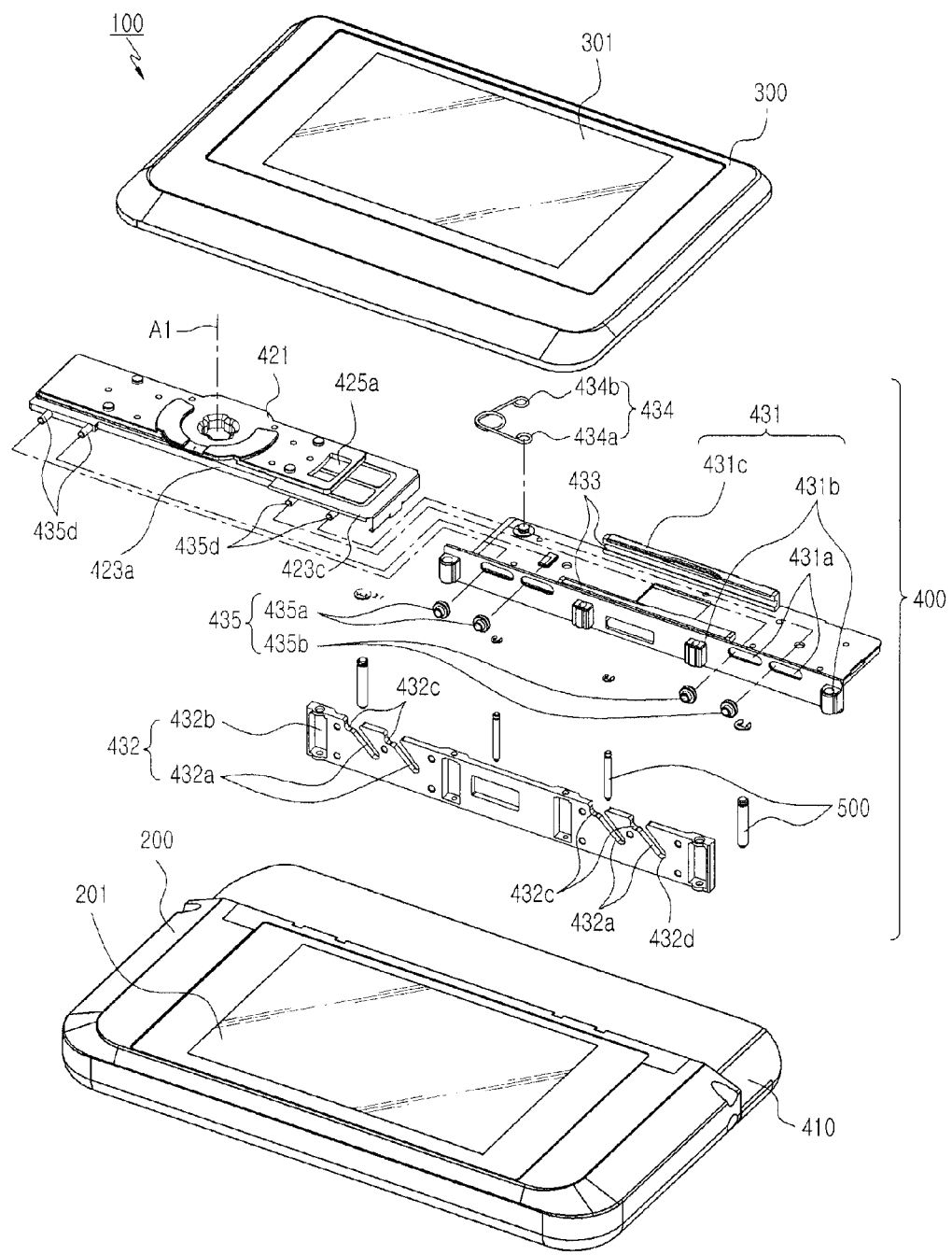
FIG. 4 is an exploded perspective view illustrating a state before the hinge mechanism of the swing-type portable communication apparatus in accordance with a preferred exemplary embodiment of the present invention is assembled.

As shown in FIGS. 3 and 4, the hinge mechanism 400 includes a hinge housing 410 (shown in FIG. 4), a swing hinge part 420, and a slide hinge part 430 (both shown in FIG. 3). The hinge housing 410 is provided at one end of the body housing 200 to be obliquely slidable. The swing hinge part 420 is provided within the hinge housing 410 and coupled with the swing housing 300 for enabling the same to be rotated about a hinge axis A1. The slide hinge part 430 is coupled with the swing hinge part 420 for enabling the swing housing 300 and the swing hinge part 420 to be obliquely slid along the direction of the hinge axis A1.

Referring now to FIG. 3, the swing hinge part 420 includes a swing plate 421, a swing member 422, a swing hinge member 423, a pair of elastic members 424, a swing locking part 425, and a stopper 426. The swing plate 421 is secured to the swing housing 300 to swing the same. The swing member 422 is coupled to the swing plate 421 so as to be swung about the hinge axis A1. The swing hinge member 423 is assembled with the swing plate 421 and the swing member 422 in order to swingably support both the swing plate 421 and the swing member 422. The elastic members 424 is coupled with the swing member 422 and the swing hinge member 423 to make both the swing plate 421 and the swing member 422 swingable. Meanwhile, the swing locking part 425 is provided between the swing plate 421 and the swing hinge member 423 such that it can be rotated in a hole 425a formed at the swing plate 421 and provide a feeling of a click while being attached or detached by an elastic force. The stopper 426 is provided between the swing plate 421 and the swing hinge member 423 so as to restrict the swing movement of the swing housing 300 depending upon contacts with first and second contact stoppers 421a and 421b formed at the swing plate 421.

As shown in FIG. 3, a washer 600 is provided between the swing hinge member 423 and the swing plate 421 to facilitate the swing movement of the swing plate 421.

Still referring FIG. 3, the swing locking part 425 includes a hole 425a, a locker 425b, a hinge pin 425c, a coil spring 425d, and a support member 425e. The hole 425a is formed at the swing plate 421 so that it can be attached to or detached from the locker 425b according to the swing movement of the swing plate 421. The locker 425b is provided at the swing hinge member 423 such that it can be rotated depending upon making contact with the hole 425a and provide a feeling of a click while being attached to or detached therefrom by an elastic force. The hinge pin 425c is rotatably coupled with the locker 425b to rotate the same according to contact with the hole 525a. The coil spring 425d is penetratively assembled with the hinge pin 425c to apply an elastic force to the locker 425b. The support member 425e is secured to the swing hinge member 423 to support the rotational movement of the locker 425b.

As shown in FIG. 3, the slide hinge part 430 includes one or more roller parts 435, first, second and third guide sliding parts 431, 432 and 433, and an elastic member 434. The roller parts 435 are provided at the swing hinge member 423 to be displaceable in a leftward-rightward direction and obliquely slidable by the first and second guide sliding parts 431, 432. Here, the first guide sliding part 431 is slidably coupled with the roller parts 435, and further provided at the lower portion of the swing hinge part 420 for movement in an upward-downward direction of the hinge axis A1 and also guide the roller parts 435 to be displaceable in a leftward-rightward direction. Next, the second guide sliding part 432 is coupled to the side surface of the first guide sliding part 432 in order to guide the upward or downward movement of the first guide sliding part 431, and for moving the roller parts 435 in a leftward-rightward direction by the first guide sliding part 431, and guide the roller parts 435 to be obliquely slidable. Meanwhile, the third guide sliding part 433 is secured to the first guide sliding part 431 in which it can be coupled with a guide rail 423a formed on opposite sides of the swing hinge member 423 to be slidably moved in a leftward-rightward direction. The elastic member 424 is provided between the swing hinge member 423 and the first guide sliding part 431 in order to apply an elastic force to displace the swing hinge member 423 in a leftward-rightward direction and for obliquely sliding the same.

Referring to FIG. 3, the roller part 435 includes first and second rollers 435a and 435b. The first roller 435a is rotatably coupled with protrusions 435d of the swing hinge member 423, while the second roller 435b is rotatably coupled with protrusions 435d of a thread part 435c of the swing hinge member 423.

The swing hinge member 423 and the thread part 435c are formed with protrusions 435d to rotatably support the first and second rollers 435a and 435b.

As shown in FIGS. 3 and 4, the swing hinge member 423 is provided with a cover 423c to protect the thread part 435c. In addition, the swing hinge member 423 is formed with the protrusion 423b to be engaged with a hole 435e of the second roller 435b.

Referring again to FIGS. 3 and 4, the first guide sliding part 431 includes one or more guide roller holes 431a, one or more guide holes 431b, and a pair of slide supporting parts 431c. The guide roller holes 431a are penetratively coupled with the protrusions 435d, which enables the roller parts 435 to be engaged and slidably guided in a leftward-rightward direction. In contrast, the guide holes 431b are provided at the first guide sliding part 431 and coupled with one or more guide pins 500 provided at the second guide sliding part 432 to slidably guide the first guide sliding part 431 in an upward-downward direction. The slide supporting parts 431c are arranged at the first guide sliding part 431 for coupling with the third guide sliding part 433 to slidably guide the third guide sliding part 433 in a leftward-rightward direction.

As shown in FIGS. 3 and 4, the second guide sliding part 432 includes one or more guide roller grooves 432a and mounting holes 432b. The guide roller grooves 432a are provided at the second guide sliding part 432 and coupled with the roller parts 435 to obliquely and slidably guide the roller parts 435. The mounting holes 432b are provided near the guide roller grooves 432a to receive the guide pins 500 and to provide a space in which the guide holes 431b coupled with the guide pins 500 are displaceable in an upward-downward direction. An engaging groove 432c is provided at one end of each guide roller groove 432a to engage with each roller part 435. Formed at the other end of the guide roller groove 432a is a stopper groove 432d to restrict the movement of the roller parts 435. One end 434a of the elastic member 434 is secured to the swing hinge member 423, while the other end 434b of the elastic member 434 is secured to a protrusion 431d formed at the first guide sliding part 431 in order to permit compression or tensioning for applying an elastic force to move the swing hinge member 423 in a leftward-rightward direction.

As described hereinabove, an exemplary swing-type communication apparatus employed with the hinge mechanism in accordance with the preferred exemplary embodiment of the present invention has been disclosed. However, the swing-type communication apparatus is not limited only to a mobile communication terminal, and the invention is applicable to various types of terminals having a hinged mechanism.

Examples of a portable communication apparatus employed with the hinge mechanism in accordance with the preferred exemplary embodiment of the present invention may include mobile communication terminals operating on the basis of a telecommunication protocol which corresponds to a variety of communication systems, information communication apparatuses, multimedia devices or applied devices thereof, such as a portable multimedia player (PMP), an MP3 player, a navigation device, a game player, a laptop computer, a signboard, a TV, a digital broadcasting player, a Personal Digital Assistant (PDA), a smart phone or the like.

Operations of the swing-type communication apparatus with the hinge mechanism having the construction as described above in accordance with the preferred exemplary embodiment of the present invention will now be described in more detail with reference to FIGS. 3 through 19 hereinbelow.

Referring to FIG. 4, the swing-type communication apparatus 100 preferably includes the body housing 200 having the first display part 201, the swing housing 300 having the second display part 301, and the hinge mechanism 400. The hinge mechanism 400 (also shown in FIG. 3) includes the hinge housing 410, the swing hinge part 420, and the slide hinge part 430. Further, the swing hinge part 420 includes the swing plate 421, the swing member 422, the swing hinge member 423, a pair of elastic member 424, the swing locking part 425, and the stopper 426. Here, the swing plate 421, the swing member 422, the swing hinge member 423, the pair of elastic member 424, the swing locking part 425, and the stopper 426 are coupled in turn to constitute the swing hinge part 420. Meanwhile, the swing locking part 425 includes the hole 425a, the locker 425b, the hinge pin 425c, the coil spring 425d, and the support member 425e. The swing locking part 425 is constructed by assembling the locker 425b, the hinge pin 425c, the coil spring 425d, and the support member 425e within the hole 425a.

As shown in FIG. 3, the slide hinge part 430 includes one or more roller parts 435, first, second and third guide sliding parts 431, 432 and 433, and the elastic member 434. Here, one or more roller parts 435, first, second and third guide sliding parts 431, 432 and 433, and the elastic member 434 are assembled therewith in turn. The roller parts 435 include first and second rollers 435a and 435b. Meanwhile, the first guide sliding part 431 includes one or more guide roller holes 431a, one or more guide holes 431b, and a pair of slide supporting parts 431c, while the second guide sliding part 432 includes one or more guide roller grooves 432a and mounting holes 432b.

Referring to FIG. 4, the first guide sliding part 431 is positioned under the swing hinge part 420 so as to swingably support the swing hinge part 420. The second guide sliding part 432 is provided on the side surface of the first guide sliding part 431 to slidably move the first guide sliding part 431 in an upward-downward direction along the hinge axis A1 and obliquely slide in the same direction. One end 434a of the elastic member 434 is then secured to the swing hinge member 423, while the other end 434b of the elastic member 434 is secured to the protrusion 431d formed at the first guide sliding part 431.

Figure 10:
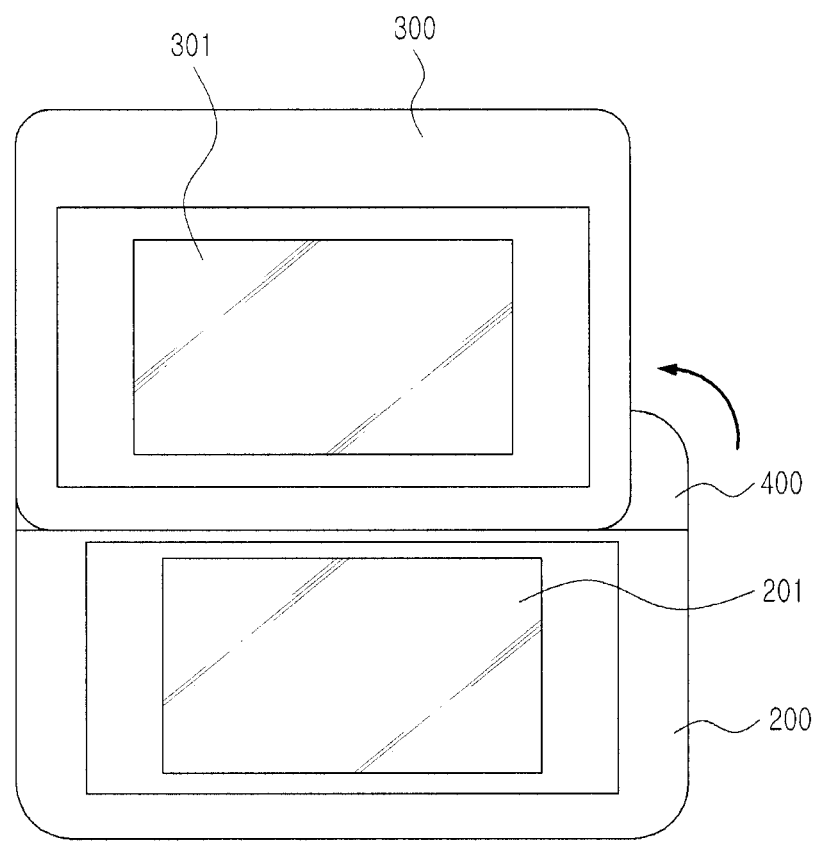
FIG. 10 is a plan view illustrating a swinging procedure of the hinge mechanism of the swing-type portable communication apparatus in accordance with a preferred exemplary embodiment of the present invention.
Figure 11:
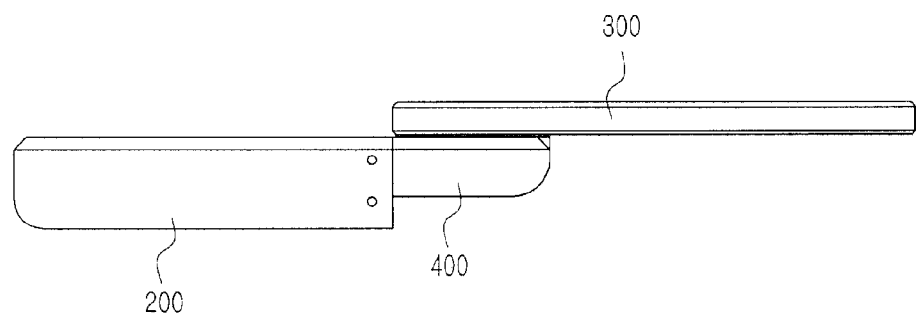
FIG. 11 is a side elevational view illustrating the swinging procedure of the hinge mechanism of the swing-type portable communication apparatus in accordance with a preferred exemplary embodiment of the present invention.
Figure 12:
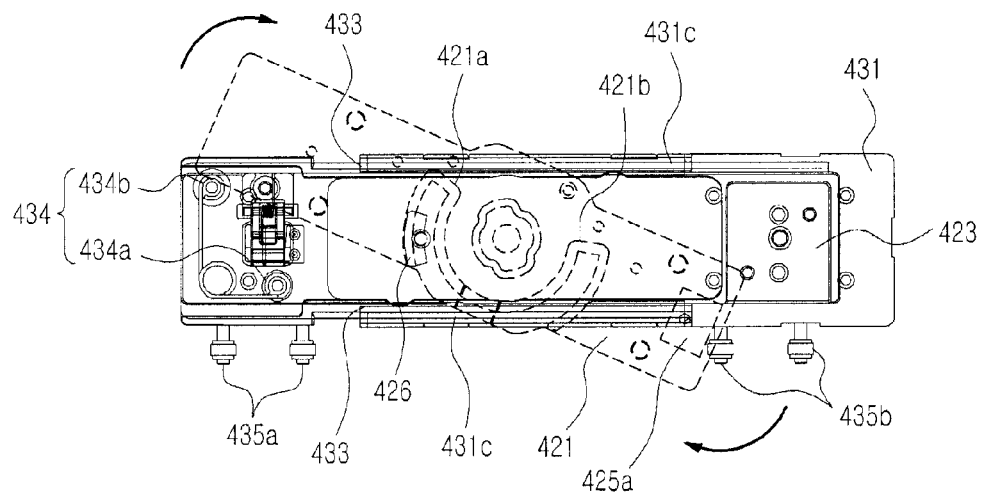
FIG. 12 is a plan view illustrating the swinging procedure of a swing plate among the hinge mechanism of the swing-type portable communication apparatus in accordance with a preferred exemplary embodiment of the present invention.
Figure 13:
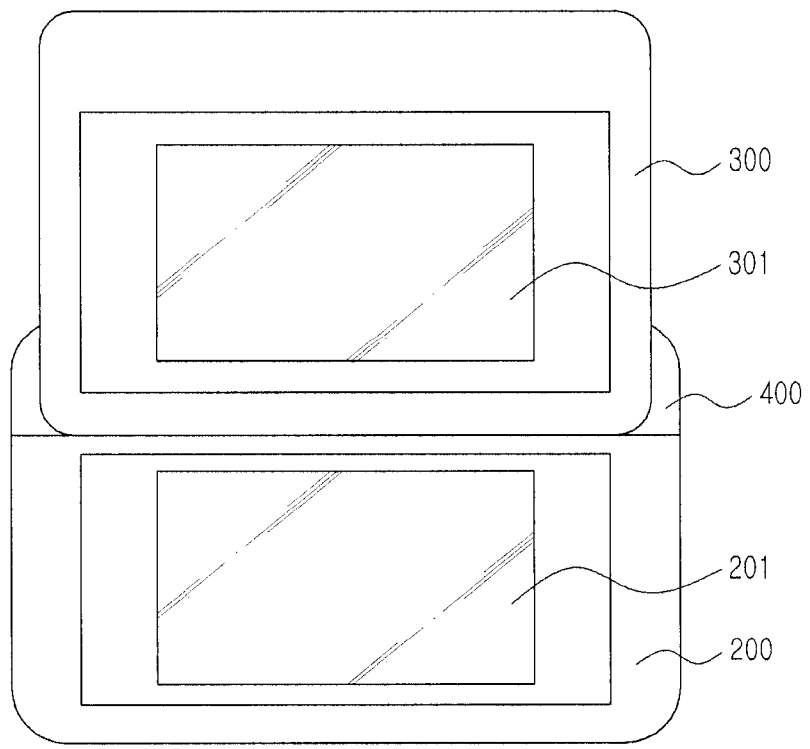
FIG. 13 is a plan view illustrating a state after the hinge mechanism is swung in the swing-type portable communication apparatus in accordance with a preferred exemplary embodiment of the present invention.
Figure 14:
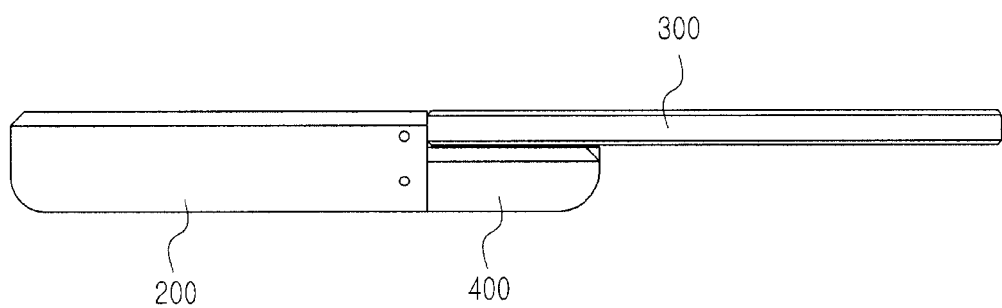
FIG. 14 is a side elevational view illustrating a state after the hinge mechanism is swung in the swing-type portable communication apparatus in accordance with a preferred exemplary embodiment of the present invention.

As shown in FIGS. 10 to 12, in this particular housing when the swing housing 300 is swung from the body housing 200, the swing plate 421 and the swing member 422 are rotated about the hinge axis A1 together with the swing housing 300.

The pair of elastic members 424 enables the swing plate 421 and the swing member 422 to be semi-automatically swingable by its elastic force.

Figure 17:
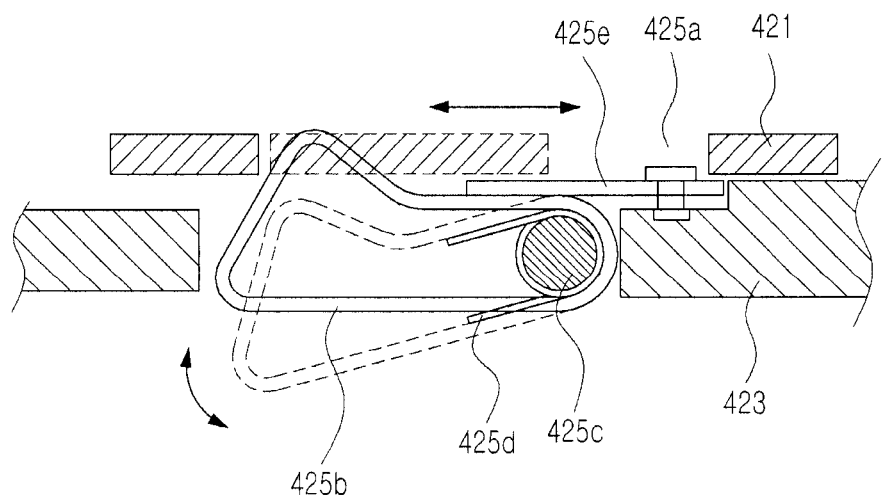
FIG. 17 is an enlarged sectional view along line A-A' of FIG. 16.

As shown in FIG. 17, the hole 425a formed at the swing plate 421 is also swung, and then the locker 425b provided at the swing hinge member 423 is inserted into the hole 425a upon coming into contact with the hole 425a. Here, the locker 425b is rotated by the hinge pin 425c and further provides a feeling of a "click" by the elastic force of the coil spring 425d.

Figure 16:
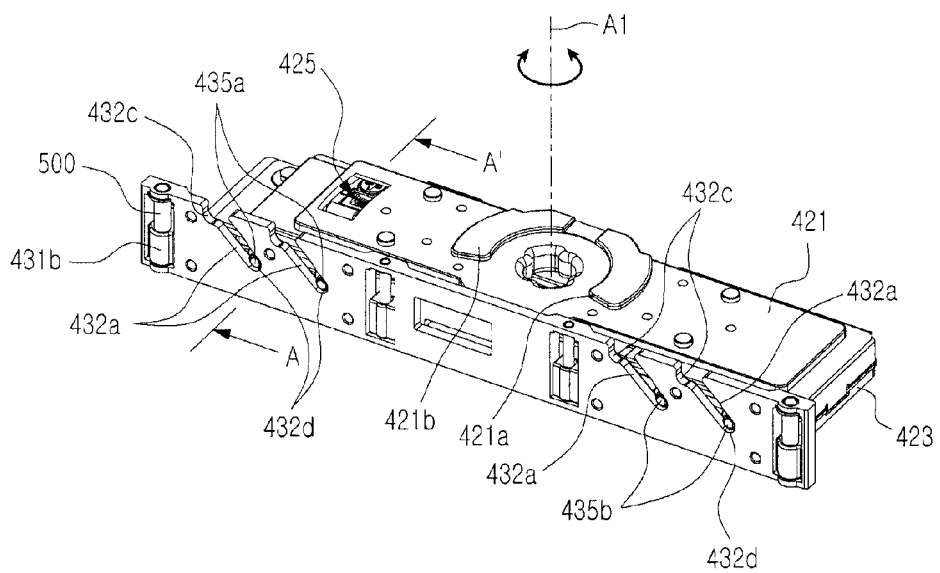
FIG. 16 is a perspective view illustrating a state after the hinge mechanism is swung in the swing-type portable communication apparatus in accordance with a preferred exemplary embodiment of the present invention.

As shown in FIG. 16, the locker 425b is inserted into the hole 425a and also limits the swing movement of the swing plate 421.

At this point, as shown in FIGS. 11 and 12, since the swing hinge member 423 is provided with the stopper 426, the stopper 426 comes out of the first contact stopper 421a formed at the swing plate 421 to make a contact with the second contact stopper 421b, thereby restricting the rotation of the swing plate 421 in 180 degrees. In this state, as shown in FIG. 19, the elastic member 434 provided at the slide hinge part 430 is tensioned from its compressed state to slidably move the swing plate 421 in a left to right direction by its elastic force (as can be seen by comparing FIGS. 12 and 19).

Referring to FIGS. 3 and 4, the protrusions 435d are guided in the guide roller holes 431a formed at the first guide sliding part 431.

Figure 18:
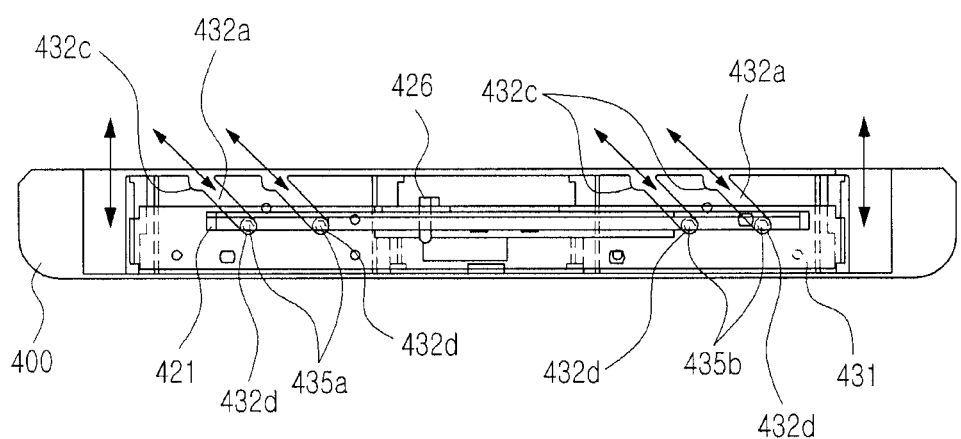
FIG. 18 is a front view illustrating a state after the hinge mechanism is swung in the swing-type portable communication apparatus in accordance with a preferred exemplary embodiment of the present invention.
Figure 19:
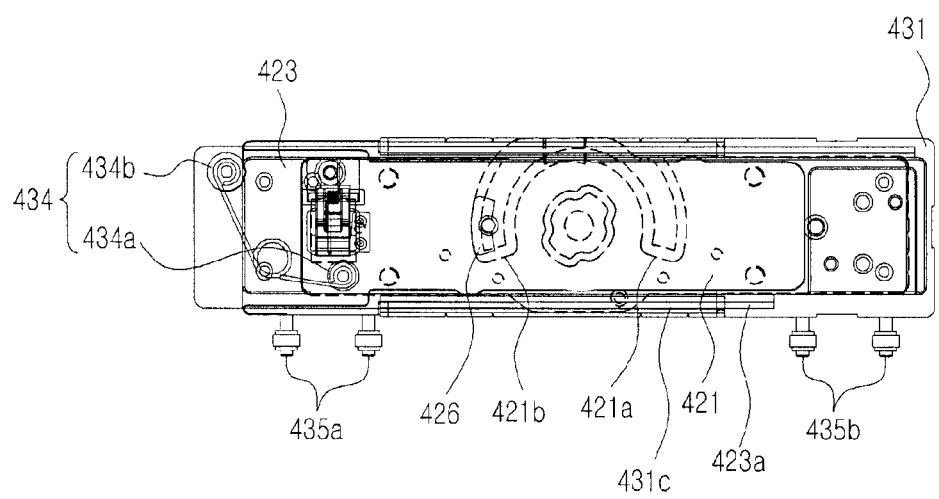
FIG. 19 is a plan view illustrating a state after the hinge mechanism is swung in the swing-type portable communication apparatus in accordance with a preferred exemplary embodiment of the present invention.

At the same time, as shown in FIGS. 18 and 19, the first and second rollers 435a and 435b are obliquely slid by the guide roller grooves 432a formed at the second guide sliding part 432.

As shown in FIGS. 16 and 19, the first and second rollers 435a and 435b are obliquely slid by the guide roller grooves 432a, and the guide holes 431b of the first guide sliding part 431 are slidably moved in a downward direction along the guide pin 500 mounted at the second guide sliding part 432.

Referring now to FIG. 18, the first and second rollers 435a and 435b come out of the engaging grooves 432c formed at one end of the guide roller grooves 432a, are obliquely slid and then inserted in the stopper grooves 432d formed at the other end of the guide roller grooves 432a, in which the sliding movement of the first and second rollers 435a and 435b in the oblique direction is restricted. At this point, the swing plate 421 can be obliquely slid together with the first guide sliding part 431 and further moved in a downward direction along the hinge axis A1, and the slide hinge part 430 and swing housing 300 are also moved together.

Figure 15:
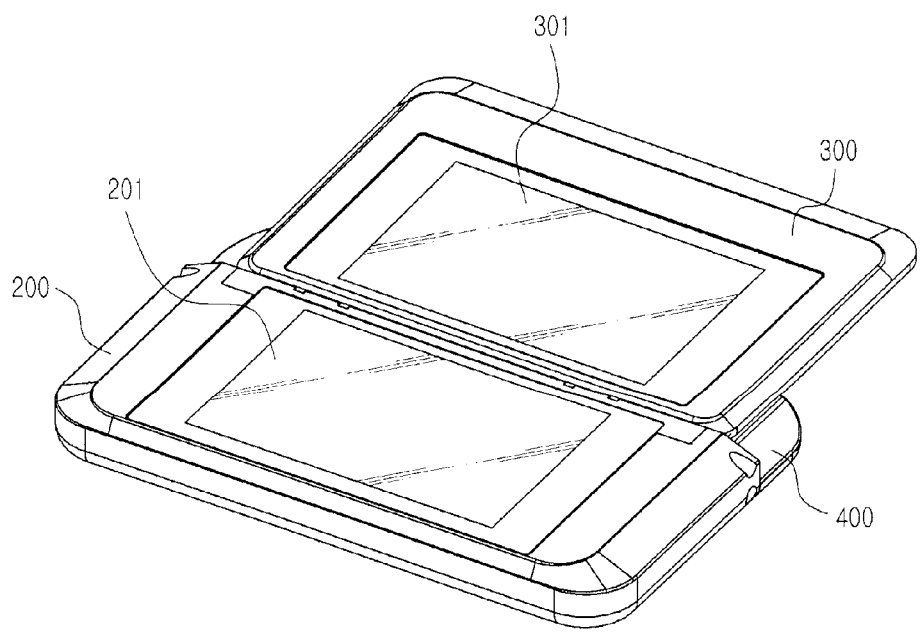
FIG. 15 is a perspective view illustrating a state after the swing housing is swung in the swing-type portable communication apparatus in accordance with a preferred exemplary embodiment of the present invention is swung.

As shown in FIG. 15, the swing housing 300 and the body housing 200 are juxtaposed, i.e., arranged in parallel at the same angle without a height difference.

Here, the second display 301 of the swing housing 300 shown in FIG. and the first display 201 of the body housing 200 are similarly arranged in parallel at the same angle without a height difference therebetween, which makes it possible to maximize the size of the first and second displays 201, so as to be used as a touch screen or a keypad.

From this state, as shown in FIGS. 5 to 9, in order to return the swing housing 300 to its initial position, the hinge housing 410 together with the swing housing 300 is moved upwards along the direction of the hinge axis A1.

Figure 9:
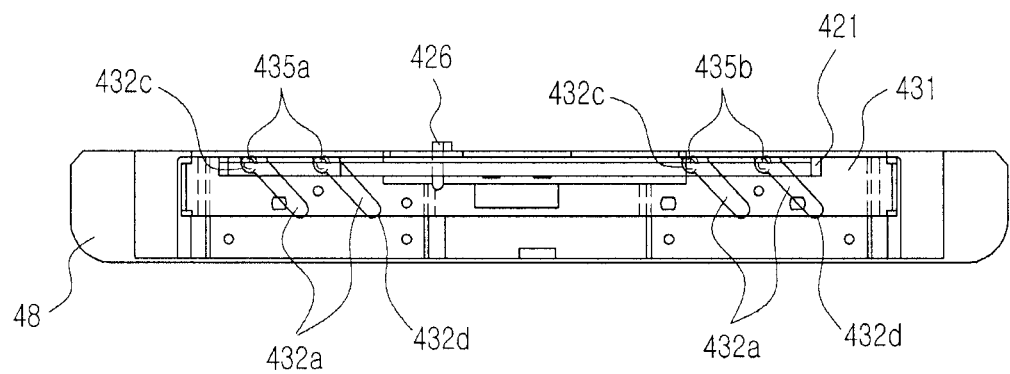
FIG. 9 is a front view illustrating a state before the hinge mechanism is swing in the swing-type portable communication apparatus in accordance with a preferred exemplary embodiment of the present invention.

As shown in FIG. 9, the slide hinge part 430 is then moved in an upward direction and at the same time obliquely slid.

Figure 6:
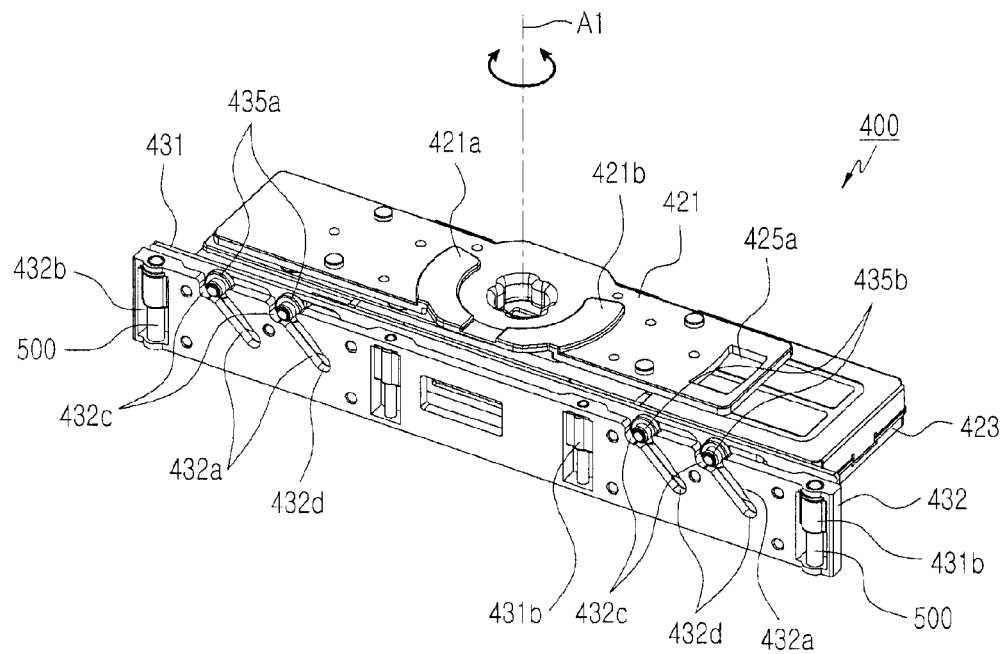
FIG. 6 is a perspective view illustrating a state wherein the hinge mechanism is assembled in the swing-type portable communication apparatus in accordance with a preferred exemplary embodiment of the present invention.
Figure 7:
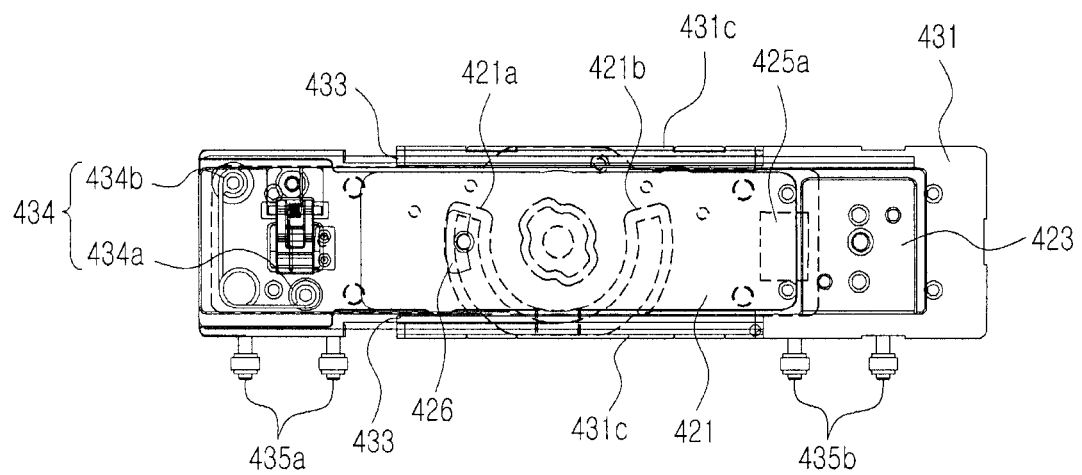
FIG. 7 is a plan view illustrating a state before the hinge mechanism is swung in the swing-type portable communication apparatus in accordance with a preferred exemplary embodiment of the present invention.
Figure 8:
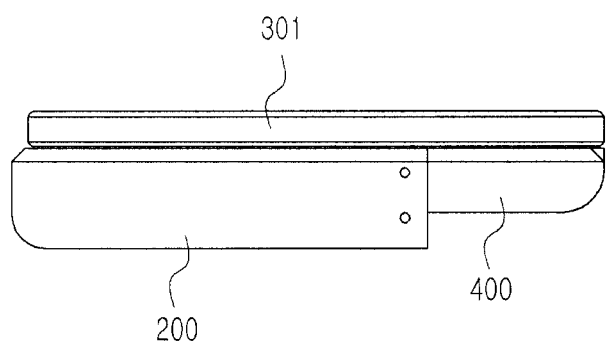
FIG. 8 is a side elevational view illustrating a state before the hinge mechanism is swung in the swing-type portable communication apparatus in accordance with a preferred exemplary embodiment of the present invention.

Referring now to FIGS. 6 and 7, the protrusions 435d of the first and second rollers 435a and 435b are guided in a right to left direction in the guide roller holes 431a formed at the first guide sliding part 431.

At the same time, as shown in FIG. 9, the first and second rollers 435a and 435b are obliquely slid and then moved upwards by the guide roller grooves 432a formed at the second guide sliding part 432.

As shown in FIGS. 6 and 9, the first and second rollers 435a and 435b are obliquely slid by the guide roller grooves 432a, and the guide roller holes 431a of the first guide sliding part 431 are slidably moved in an upward direction along the guide pin 500 received in the second guide sliding part 432.

Referring now back to FIG. 6, the first and second rollers 435a and 435b come out of the stopper grooves 432d of the guide roller grooves 432a, obliquely slide to move upwards, and then engage with the engaging groove 432c of the guide roller grooves 432a, in which their sliding movement in the oblique direction is restricted.

At this point, as shown in FIG. 7, the elastic member 434 of the slide hinge part 430 is slid in a right to left direction of the first guide sliding part 431 and then compressed. At the same time, the swing plate 421 along with the first guide sliding part 431 is also obliquely slid and moved in an upward direction.

Figure 5:
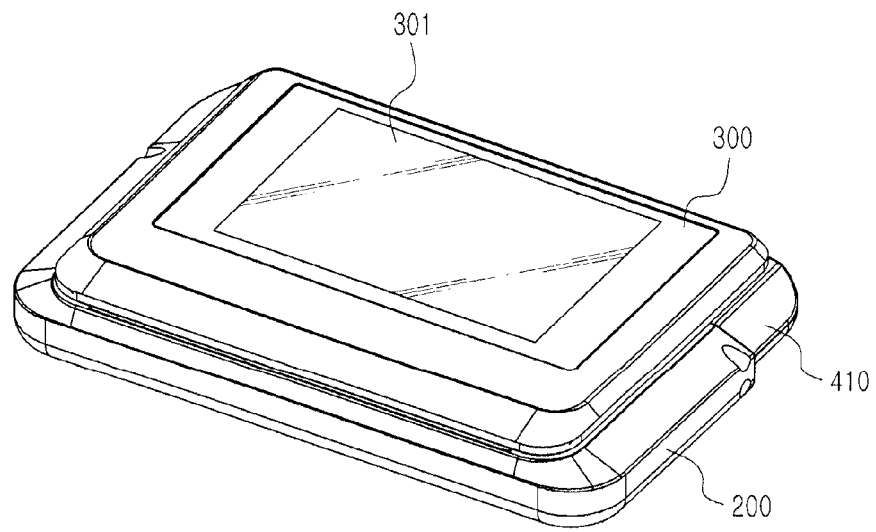
FIG. 5 is a perspective view illustrating the swing-type portable communication apparatus in accordance with a preferred exemplary embodiment of the present invention.

As shown in FIG. 5, the swing housing 300 is rotated about the hinge axis A1 and returned to its initial position, facing the body housing 200.

Here, as shown in FIG. 7, since the swing hinge member 423 is provided with the stopper 426, the stopper 426 is disengaged from the second contact stopper 421b and then comes into contact with the first contact stopper 421a, thereby restricting the swing movement of the swing plate 421. At this moment, the hole 425a formed at the swing plate 421 is also swung to its initial position and then disengaged from the locker 425b provided at the swing hinge member 423.

While the invention has been shown and described with reference to certain exemplary embodiments of the swing-type portable communication apparatus and the hinge mechanism thereof, it will be understood by those skilled in the art that various changes in form and details may be made therein without departing from the spirit and scope of the invention as defined by the appended claims.

What is claimed is:

1. A swing-type portable communication apparatus comprising:
a body housing having a first display part;
a swing housing having a second display part and being obliquely slidable from a first position over an upper surface of the body housing and for being juxtaposed with the body housing at a second position at an equal angle without a height difference after being swung from the body housing; and a hinge mechanism having a swing hinge part and a slide hinge part provided at one end of the body housing for obliquely sliding the swing housing after the swing housing is swung from the first position to the second position, the swing hinge part having a swing member rotatably coupled to a swing plate, both rotates about a hinge axis and further having a swing hinge member; the slide hinge part having a first guide sliding part coupled with at least one guide pin provided at a second guide sliding part for providing translational motion in a vertical direction of the swing housing from a first plane to a second plane, and a third guide sliding part secured to the first guide sliding part, wherein the third guide sliding part is coupled with a guide rail formed on opposite sides of the swing hinge member to be slidably moved substantially in a horizontal direction.

2. The swing-type portable communication apparatus as recited in claim 1, wherein the first and second displays comprise respective display parts, so when the swing housing is obliquely slid into the second position, the first and second displays are arranged in parallel in the same plane in order to maximize the available area of the display parts provided as a touch screen or a visual keypad.

3. The swing-type portable communication apparatus as recited in claim 1, wherein the swing-type portable communication apparatus comprises one or more of a PMP player, MP3 player, a personal digital assistant (PDA) and a smart phone.

4. A hinge mechanism of a swing-type portable communication apparatus, comprising:
a body housing having a first display part, a swing housing having a second display part and being obliquely slidable from a first position over an upper surface of the body housing and juxtaposed at an equal angle without a height difference with the body housing at a second position away from the body housing, and a hinge mechanism having a swing hinge part and a slide hinge part provided at one end of the body housing for obliquely sliding the swing housing after the swing housing is swung from the first position to the second position the swing hinge part having a swing member rotatably coupled to a swing plate, both rotates about a hinge axis and further having a swing hinge member; the slide hinge part having a first guide sliding part coupled with at least one guide pin provided at a second guide sliding part for providing translational motion in a vertical direction of the swing housing from a first plane to a second plane and, and a third guide sliding part secured to the first guide sliding part, wherein the third guide sliding part is coupled with a guide rail formed on opposite sides of the swing hinge member to be slidably moved substantially in a horizontal direction,
the hinge mechanism comprising:
a hinge housing provided at one end of the body housing;
a swing hinge part provided at the hinge housing and coupled with the swing housing for enabling rotation of the swing housing from the first position to the second position; and
a slide hinge part coupled with the swing hinge part for enabling the swing housing and the swing hinge part to be obliquely slid.

5. The hinge mechanism as recited in claim 4, wherein the swing hinge part includes:
a swing plate swingably secured to the swing housing;
a swing hinge member swingably assembled with the swing plate and the swing member;
a pair of elastic members coupled with the swing member and the swing hinge member for providing an elastic force applying to both the swing plate and the swing member;
a swing locking part provided between the swing plate and the swing hinge member to restrict the swing movement of the swing plate, and rotated in a hole formed at the swing plate, providing a feeling of a click by an elastic force when the swing plate is moved; and
a stopper provided between the swing plate and the swing hinge member to restrict the swing movement of the swing housing depending upon contacts with first and second contact stoppers formed at the swing plate.

6. The hinge mechanism as recited in claim 5, wherein swing locking part comprises:
the swing plate having a hole formed therein;
a locker provided at the swing hinge member for insertion into the hole in the swing plate to restrict the swing movement of the swing plate and rotated depending upon making contact with the hole to provide a feeling of a click while being attached or detached by an elastic force;
a hinge pin rotatably coupled with the locker;
a coil spring penetratively assembled with the hinge pin to apply an elastic force to the locker; and
a support member secured to the swing hinge member to support the rotational movement of the locker.

7. The hinge mechanism as recited in claim 5, wherein the slide hinge part comprises:
one or more roller parts;
the first guide sliding part slidably coupled with the one or more roller parts, the first guide sliding part being movable in vertical direction of the hinge axis while guiding the roller parts to be movable in a substantially horizontal direction;
the second guide sliding part coupled to the first guide sliding part wherein the second guide sliding part guides the vertical movement of the first guide sliding part, moves the roller parts in the horizontal direction by the first guide sliding part, and guides the roller parts to be obliquely slidable; and
an elastic member for applying an elastic force to move the swing hinge member in a horizontal direction and obliquely slide the swing hinge member.

8. The hinge mechanism as recited in claim 7, wherein the roller parts include first and second rollers,
the first roller is rotatably coupled with protrusions of the swing hinge member,
the second roller is rotatably coupled with protrusions of a thread part of the swing hinge member, and
the swing hinge member and the thread part are formed with protrusions to rotatably support the first and second rollers.

9. The hinge mechanism as recited in claim 8, wherein the swing hinge member is provided with a cover to protect the thread part, and the swing hinge member is formed with one or more protrusions to be engaged with one or more holes respectively formed at the second roller.

10. The hinge mechanism as recited in claim 8, wherein the first guide sliding part comprises:
one or more guide roller holes penetratively coupled with the protrusions to guide the roller parts to be slidably moved in a substantially horizontal direction;
one or more guide holes penetratively coupled with one or more guide pins provided at the second guide sliding part to guide the first guide sliding part to be slidably moved in a substantially vertical direction; and
a pair of slide supporting parts coupled with the third guide sliding part to guide the first guide sliding part to be slidably moved in a substantially horizontal direction.

11. The hinge mechanism as recited in claim 10, wherein the second guide sliding part comprises:
one or more guide roller grooves coupled with the roller parts to guide the roller parts to obliquely slide; and
mounting holes provided near the guide roller grooves to receive the guide pins and to provide a space in which the guide holes penetratively coupled with the guide pins are displaceable in a substantially vertical direction.

12. The hinge mechanism as recited in claim 11, wherein an engaging groove is provided at one end of each guide roller groove to engage with each roller part, and wherein a stopper groove is formed at the other end of the guide roller groove to restrict the movement of each roller part.

13. The hinge mechanism as recited in claim 7, wherein a first end of the elastic member is secured to the swing hinge member and a second end of the elastic member is secured to the protrusion formed at the first guide sliding part so as to be compressed or tensioned to apply an elastic force to move the swing hinge member in a leftward-rightward direction.

14. The hinge mechanism as recited in claim 6, wherein the swing-type portable communication apparatus one or more of a PMP player, MP3 player, a personal digital assistant (PDA) and a smart phone.

15. The hinge mechanism as recited in claim 4, when said hinge mechanism slides a swing housing obliquely, first and second displays of the swing housing are arranged in parallel at the same angle without a height difference there between to provide a touch screen or visual keypad.

\* \* \* \* \*